United States Patent [19]

Bowers et al.

[11] Patent Number: 5,288,089
[45] Date of Patent: Feb. 22, 1994

[54] BRAKE MECHANISM FOR TELESCOPING SHOPPING CARTS

[76] Inventors: A. Dave Bowers, P.O. Box 2606, Sherman, Tex. 75091; Johnny Roe, Rte. Box 236, Sherman, Tex. 75090

[21] Appl. No.: 43,347

[22] Filed: Apr. 6, 1993

[51] Int. Cl.$^5$ .............................................. B62B 5/04
[52] U.S. Cl. .................................. 280/33.994; 188/19
[58] Field of Search ................. 280/33.994; 188/19, 188/29, 5; 16/35 R

[56] References Cited

U.S. PATENT DOCUMENTS

| | | |
|---|---|---|
| 2,958,537 | 11/1960 | Young . |
| 3,061,049 | 10/1962 | Bramley ............... 280/33.994 X |
| 3,095,211 | 6/1963 | Altherr . |
| 3,458,015 | 7/1969 | Collins et al. . |
| 3,500,965 | 3/1970 | Nossokoff et al. . |
| 3,501,164 | 3/1970 | Peterson . |
| 4,840,388 | 6/1989 | Doughty . |
| 5,090,517 | 2/1992 | Doughty . |

FOREIGN PATENT DOCUMENTS

| | | |
|---|---|---|
| 2913749 | 10/1980 | Fed. Rep. of Germany .................. 280/33.994 |
| 8403073 | 8/1984 | World Int. Prop. O. ...... 280/33.994 |

Primary Examiner—Brian L. Johnson
Attorney, Agent, or Firm—Daniel Rubin

[57] ABSTRACT

A brake mechanism for a shopping cart able to brake an unattended cart while enabling manual release of the brakes for user control and automatic release of the brakes in response to telescoping joinder of the carts. Comprising the braking mechanism is a brake pad at the underside of a pair of vertically disposed brake rods displaceable for the pads to engage and disengage the caster wheels of the cart. A compressed coil spring on each brake rod biases the pad thereat toward engagement with the wheels. A transverse actuator bar adjacent the cart handle, when squeezed toward the cart handle, causes the brake rod to incur an upward camming and effect release of the brakes. At the same time, a second actuator bar resting on the swing seat of the cart and displaceable upwardly with the swing seat in response to telescoping of the carts is pivotally displaced upwardly in response to telescoping to raise the brake rods and release the brakes.

6 Claims, 2 Drawing Sheets

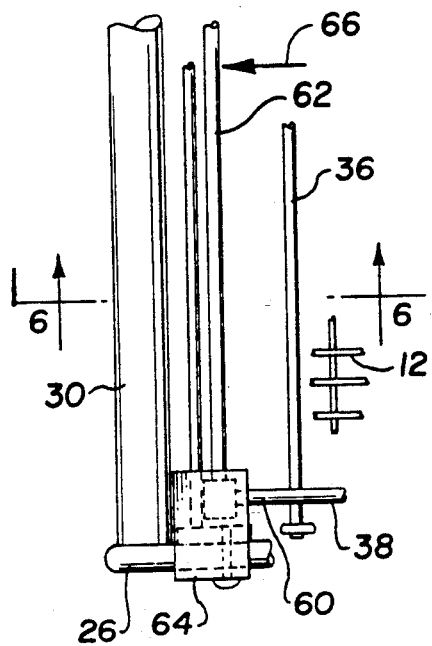
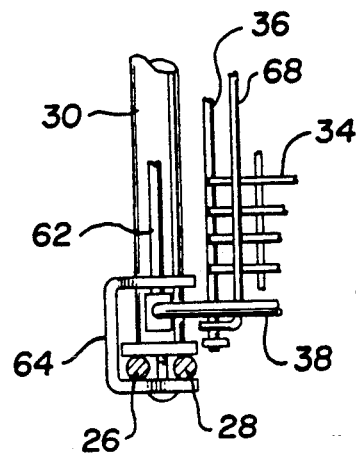
Figure 4
Figure 5
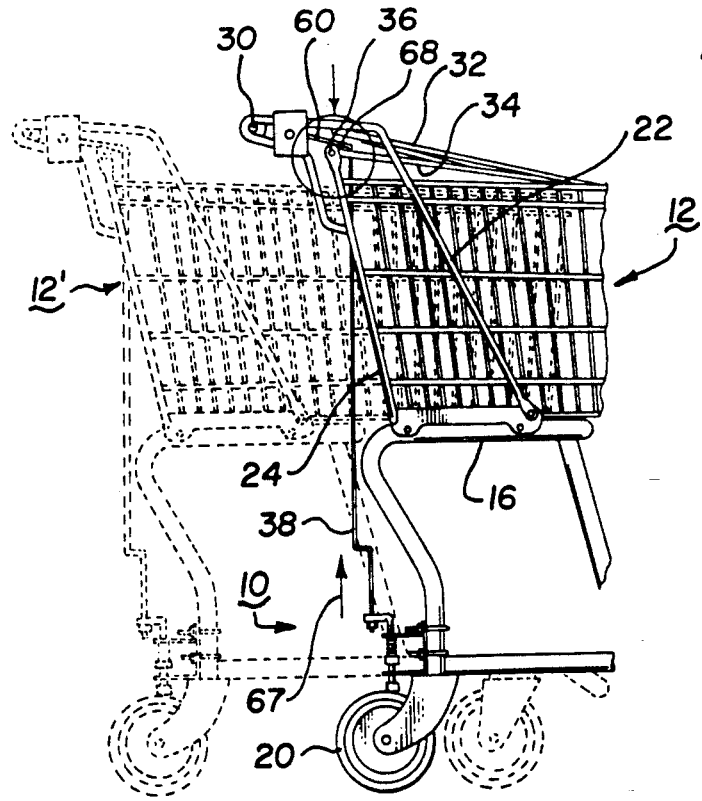
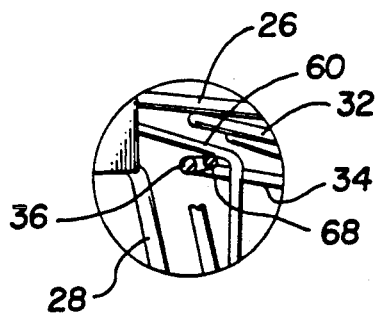
Figure 6
Figure 7
Figure 8

BRAKE MECHANISM FOR TELESCOPING SHOPPING CARTS

FIELD OF THE INVENTION

The field of art to which the invention relates comprises the art of brake mechanisms for shopping carts able to arrest mobility of an unattended cart against indiscriminate rolling.

BACKGROUND OF THE INVENTION

The unbraked, unattended shopping cart represents a hazard to person and property when permitted to roll free and uncontrolled in areas such as parking lots adjacent to retail establishments. Disposal of the cart to remain unattended occurs frequently in a parking lot after the contents have been emptied into a user's car by being placed at an arbitrary free-standing location. It is not uncommon for the unattended cart to be left on an incline of the lot surface causing the cart to roll or bump into persons or parked auto's in the area. The resulting damage can prove costly, usually for the merchandising proprietor of the premises to which the cart belongs.

BACKGROUND OF THE PRIOR ART

To avoid the damage that can result from unattended shopping carts, it has it been known to include a brake mechanism of sorts which secures and arrests the cart when unattended but which can conveniently be released by the user when a need arises for the cart to be conveyed. Exemplifying such brake mechanisms of the prior art are the disclosures of U.S. Pat. Nos. 3,458,015; 3,500,965; 3,501,164; 4,840,388.

While such brake mechanisms tend to eliminate the roll problem associated with the unattended, unbraked cart, it is also a common practice when retrieving carts from their various scattered locations to telescope them in tandem. This enables conveyance of the carts in tandem bulk to a storage site in the vicinity of or within the merchandise establishment. For such carts that have brake mechanisms, it therefore becomes necessary for these purposes to essentially deactivate the brake mechanism for so long as the telescoping is continued and reactivate the brake mechanism when cart separation occurs. Automatic release of the brake mechanism when telescoping is disclosed, for example, in U.S. Pat. Nos. 2,958,537 and 3,095,211.

OBJECTS OF THE INVENTION

It is therefore an object of the invention to provide a novel brake mechanism for a shopping cart.

It is a further object of the invention to provide a novel brake mechanism as in the previous object able to effect an improved automatic brake release in response to tandem telescoping of the carts.

It is a still further object of the invention to effect the previous objects with a highly simplistic and low cost brake mechanism so as to enhance wide spread adoption thereof and substantially, if not totally, eliminate the damage which such carts are known to cause.

SUMMARY OF THE INVENTION

This invention relates to a novel brake mechanism for use on shopping carts. More, specifically, the invention relates to such brake mechanisms which are operative to normally brake the cart subject to being released only by user actuation or when in position of a leading cart in a tandem telescoping relation.

The foregoing is achieved by a brake mechanism having a pair of brake rods vertically disposed above the rear caster wheels of the cart. Each brake rod is connected to a brake pad, spring biased for braking against the circumference of the wheel. The brake rod extends upward to the general elevation of the cart handle and in its upper portion includes an offset inclined angularly upward in a cammed relation over a transverse support rod functioning as a cam rod. Beyond the cam rod, the brake rods terminate secured at opposite ends of a hand displaceable actuator bar situated parallel and closely spaced to the transverse cart handle by which the cart is normally conveyed. Hand squeezing the actuator bar toward the cart handle causes each brake rod offset to ride up on the cam rod so as to raise the brake pad from the wheels. Releasing the actuator bar enables the spring bias to restore the pads into a braking relation against the wheels.

Each cart typically includes a rear swing seat that is pivotally supported on the cam rod. In the course of the cart being telescoped from behind, the swing seat is caused to swing upwardly within the cart basket. Supported transversely on the front face of the rear wall of the seat at a predetermined distance below the cam rod is a second actuator bar which in the course of telescoping is displaced upwardly with the seat. In this relation, the second actuator bar, in the course of being swung upward, rises above the cam rod to engage and raise the offset of the brake rods. This has the effect of automatically releasing the brakes for so long as the cart remains telescoped. Once the brakes are released the telescoped carts can be conveyed in unison to where ever they are to be relocated, usually to a store site on or about the premises. At such time as telescoping separation occurs, the seat and second actuator bar are pivotally restored to their normal relations enabling operation of the brake mechanism likewise to be restored to user control via the first actuator bar.

The above noted features and advantages of the invention as well as other superior aspects thereof will be further appreciated by those skilled in the art upon reading the detailed description which follows in conjunction with the drawings.

BRIEF DESCRIPTION OF THE DRAWINGS

FIG. 4 is a fragmentary and enlarged plan view as seen substantially from the position 4—4 of FIG. 1;

FIG. 5 is a front elevation of FIG. 4;

FIG. 6 is a fragmentary sectional view as seen substantially along the lines 6—6 of FIG. 4;

FIG. 7 is a side elevation of the cart of FIG. 1 in a telescoping relation with a second cart received from behind; and FIG. 8 is an enlarged view partially broken away of the encircled portion of FIG. 7.

DESCRIPTION OF THE PREFERRED EMBODIMENT

Figure 1:
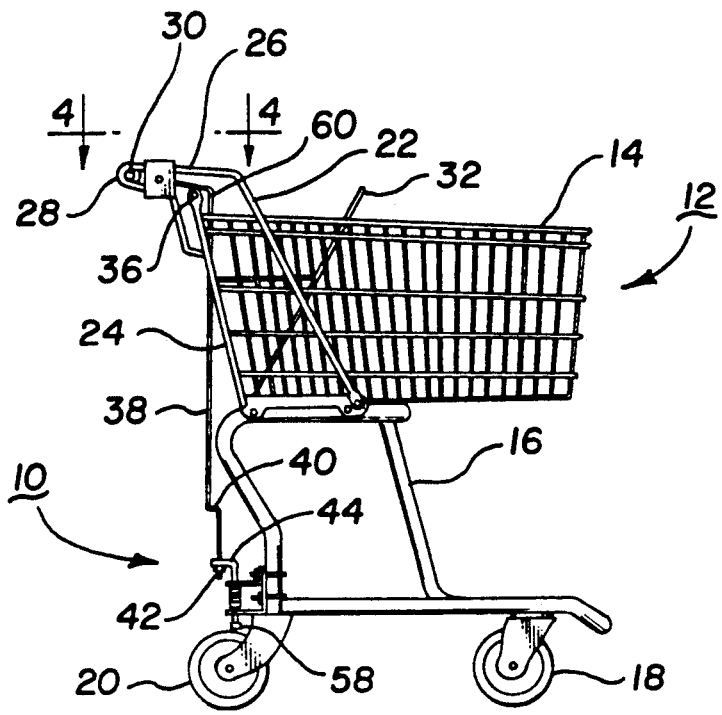
FIG. 1 is a side elevation of a typical shopping cart containing the brake mechanism hereof.
Figure 2:
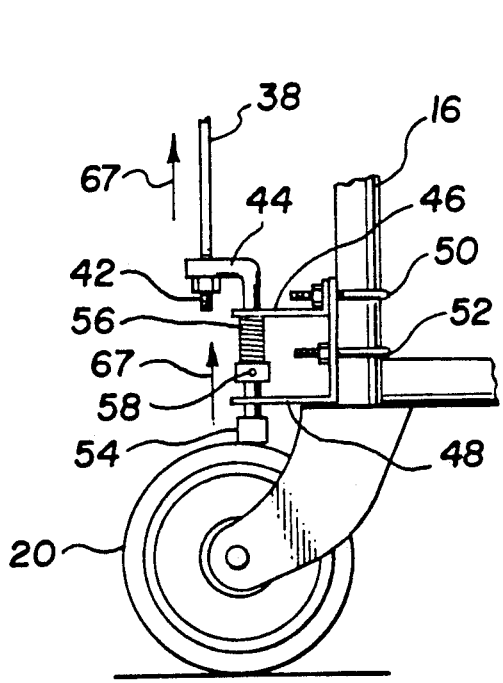
FIGS. 2-3 are enlarged side and rear elevations respectively of the brake and wheel relations.
Figure 3:
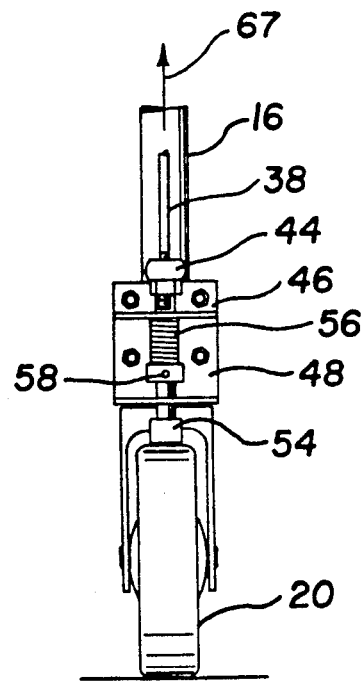

In the description which follows, like parts are marked throughout the specification and drawings with the same reference numerals respectively. The drawing figures are not necessarily to scale and in certain views parts may have been exaggerated for purpose of clarity.

Referring now to the drawings, the brake mechanism hereof designated 10 is installed on a more or less conventional shopping cart designated 12. The cart typically includes a basket 14 positioned on a frame 16 and supported for displacement on a pair of front caster wheels 18 and rear caster wheels 20. Providing side support on opposite sides of the basket and extending vertically rearward is a pair of bars 22 and 24. The former bar includes a horizontal offset 26 leading to a looped foldover 28 in which to contain transverse cart handle 30. Within the basket there is provided a swing seat 32 that includes a mesh rear wall 34 pivotally supported on a rod 36 that functions as a transverse cam rod as will be understood.

Comprising brake 10 is a brake rod 38 disposed vertically above the center of each rear wheel 20. At their lower end the rods include an offset 40 from which it extends downward to its distal end 42. Secured to each brake rod at its distal end and depending therefrom is an offset arm 44 guided for vertical displacement via apertured vertically spaced angle brackets 46 and 48. The brackets in turn are secured to the frame 16 by U-clamps 50 and 52. Supported at the distal end of arm 44 beneath bracket 48 is a brake pad 54 normally urged against the wheel circumference thereat by a compressed coil spring 56 anchored to the arm via set screw 58.

The upper portion of each brake rod 38 includes a laterally upward offset 60 that passes contiguously across transverse cam rod 36 until joined with transverse actuator bar 62. The latter is supported by side brackets 64 so as to be displaceable, by a hand squeeze, within the side opening defined by foldover 28 toward and then away from cart handle 30. In this manner, a squeezed displacement of actuator bar 62 toward the cart handle 30 in the direction of arrow 66 causes the upward offset 60 of the brake rods riding on cam rod 36 to be cammed upwardly. This raises brake pad 54 from the rear caster wheels as represented by arrow 67, enabling the cart to be conveyed at will. Releasing actuator bar 62 enables spring 56 to restore the brake relation of pads 54 against the caster wheels.

At such times as the cart is rear-ended in order to telescope the carts for the purpose of returning them in bulk to their intended storage site, the rear cart designated 12' enters the front cart from the back and in the course of which forces a collapse and displacement of the swing seat 32 inwardly of the basket. This pivotally displaces the swing seat with its rear wall 34 upwardly about cam rod 36 to the relation best seen in FIGS. 7 and 8.

To release the brake 10 in order to enable conveyance of the telescoped carts, rear wall 34 supports a second actuator bar 68 pivotally mounted on cam rod 36 so as to be arcuately displaceable with the back wall 34 in the direction of arrow 70. In so doing, second actuator bar 68 is pivotally displaced on the cam rod 36 to an elevation above the cam rod for engaging against the underside of offset 60 and forcing the offset upward. This causes the brake rods 58 to be raised as before with the pads 54 disengaging from the wheels 20. The brakes on the forward receiving cart on receipt of a telescoping rear cart are thereby automatically released for so long as the carts remain telescoped together. On separation, seat 32 is restored to its normal relation as illustrated in FIG. 1 such that second actuator bar 68 reverts to its innocuous relation with respect to the brake rod offset 60 restoring the brake to user control via actuator bar 62. Approximately a four pound squeeze force is required to operate actuator bar 62 toward cart handle 30.

By the above description there is disclosed a novel brake mechanism for shopping carts that automatically brakes an unattended cart against self conveyance. The brakes can be released by either a hand squeeze from a user of the cart or by receipt of a second cart inwardly telescoped from behind. Being braked in this manner, the damage typically associated with the unattended unbraked carts is readily eliminated. At the same time, the brake mechanism hereof represents the height of simplicity requiring a relative minimum of components such that the system can be readily adapted for widespread use in the industry.

Since many changes could be made in the above construction and many apparently widely different embodiments of this invention could be made without departing from the scope thereof, it is intended that all matter contained in the drawings and specification shall be interpreted as illustrative and not in a limiting sense.

We claim:

1. An improved brake mechanism for shopping carts having a basket, a frame supporting the basket, front and rear caster wheels secured at the underside of said frame for conveying the cart about a displacement area and a cart handle secured at the rear of the basket enabling the cart to be conveyed manually, said brake mechanism comprising:

a cam rod supported at the rear of said basket;

a pair of displaceable brake rods each mounted to said frame vertically disposed above one of said rear wheels between a lower end and an upper end and including an upwardly inclined lateral offset at the upper end which at an intermediate location contiguously crosses said cam rod;

a brake pad connected to the lower end of each brake rod for displacement therewith between a first relation engaging a rear wheel to effect braking of the wheel and a second relation displaced from a rear wheel affording a brake release of the wheel; and an actuator bar connected to the upper end of said brake rods generally parallel to said cart handle and supported for hand displacement toward said cart handle for said brake rods to be raised upwardly by said cam rod and displace said brake pads from said first relation to said second relation.

2. A brake mechanism in accordance with claim 1 including biasing means urging said brake pads into said first relation and operative in opposition to the hand displacement of said actuator bar.

3. A brake mechanism in accordance with claim 2 including release means operative in response to a second cart received by said cart inwardly telescoped from behind to effect displacement of said brake pads from said first relation to said second relation.

4. A brake mechanism in accordance with claim 3 in which the basket of said shopping cart has a pivotally displaceable rear swing seat and said release means comprises a second actuator bar secured to said swing seat for displacement therewith and operative in response to receipt of a telescoping cart from behind to effect upward displacement of the offset of said brake rods.

5. A brake mechanism in accordance with claim 4 in which said swing seat is normally oriented generally upright at the rear of the cart, a rear wall of said swing seat is supported for pivotal displacement inwardly of the basket in response to receipt of a second cart telescoped inwardly from behind and said second actuator bar when displaced with said swing seat is operative to effect a lifting engagement against the offset of said brake rods.

6. A brake mechanism in accordance with claim 5 in which said swing seat and said second actuator bar are both pivotally mounted on said cam rod.

* * * * *